Nov. 22, 1949     R. L. STALLINGS     2,488,611
INSULATED BOTTLE ASSEMBLY
Filed July 9, 1945
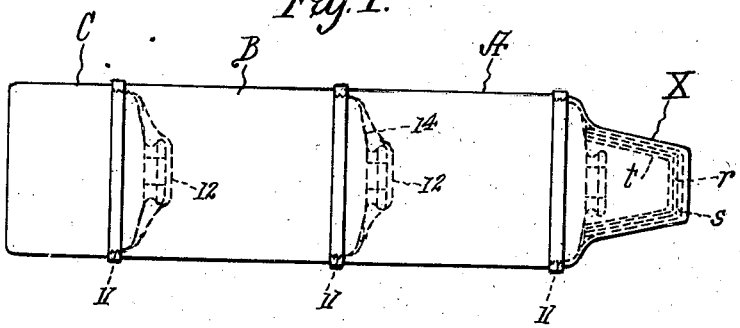
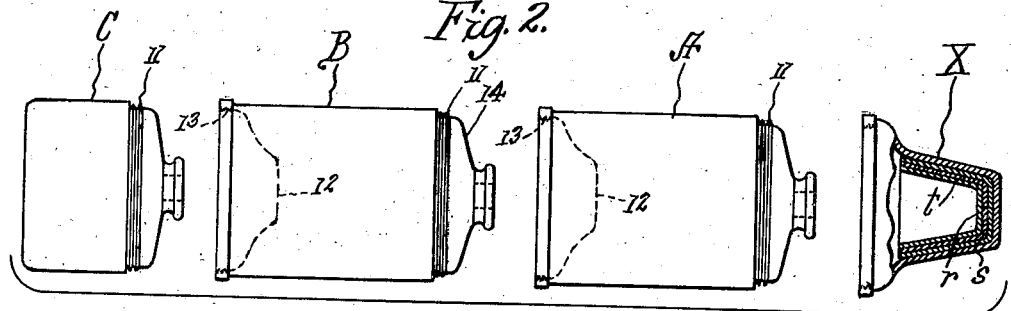
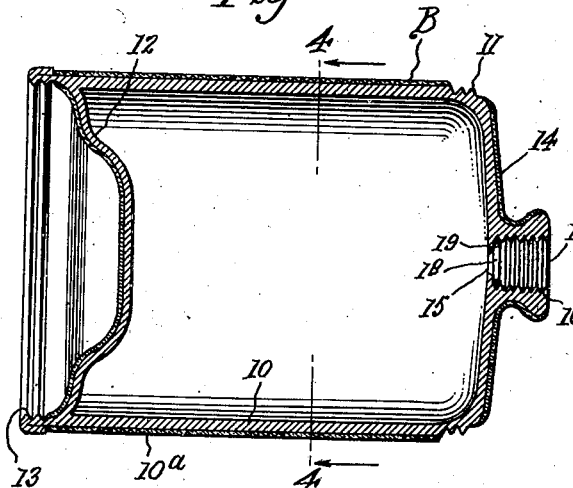
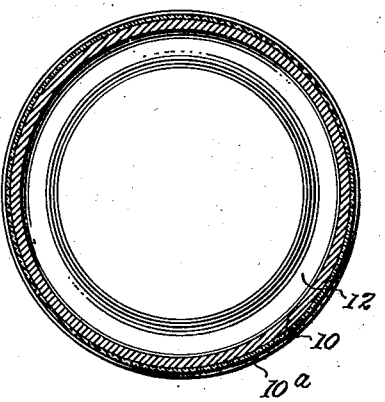
INVENTOR.
Randall L. Stallings
BY
Thomas F. Healy
Attorney Patented Nov. 22, 1949

2,488,611

UNITED STATES PATENT OFFICE 2,488,611

INSULATED BOTTLE ASSEMBLY

Randall L. Stallings, Norfolk, Va.

Application July 9, 1945, Serial No. 603,859

2 Claims. (Cl. 215—10)

The present invention relates to an insulated device, and more particularly to a sectionalized insulated assembly comprising a plurality of insulated bottles.

A primary object of the invention is to provide a compact insulated assembly having separate detachable insulated bottles each adapted to contain a different hot or cold liquid.

A further object is to provide a low cost detachable sectionalized insulated assembly which takes up little space in packing and yet permits the carrying of a plurality of different hot and/or cold liquids.

Still another object is to provide an insulated assembly comprising a plurality of insulated bottles, wherein each of said bottles is preferably provided with a raised bottom portion constructed to removably receive the top portion of an adjacent insulated bottle.

Another object is to provide an insulated bottle having a raised bottom substantially conforming in shape to the top of said bottle.

Other and further objects and advantages of this invention will be apparent from the following description thereof, and from the claims appended thereto.

In the drawing, wherein like numerals refer to like or corresponding parts throughout the several views, Figure 1 depicts a side elevation of the insulated assembly, and embodies the features of the present invention, Figure 2 is a side elevation, partly in section, showing the insulated assembly of Figure 1, in disassembled relation, Figure 3 is a longitudinal vertical section of one of the insulated bottles shown in Figure 1, Figure 4 is a sectional view of the insulated bottle taken along the line 4—4 of Figure 3, Figure 5 is a top plan of the screw plug which fits in the mouth of the insulated bottle of Figure 3, and Figure 6 is a sectional view of the screw plug shown in Figure 5.

Referring to the drawing, and more particularly to Figures 1 and 2 thereof, the letters A, B and C respectively represent individual insulated bottles, preferably being circular in cross-section, similar to the conventional insulated bottle known on the market today.

As the structure of each of the insulated bottles A, B and C, is substantially the same, with the exception of the end bottle C, the description of each of said insulated bottles will be limited to the description of one.

Referring to Figure 3 of the drawing, insulated bottle B is provided with a cylindrical wall 10 having an externally threaded portion 11 disposed on the upper outer portion thereof. The bottle B is provided with a raised concave bottom portion 12, which is shaped to receive the top portion of an adjacent insulated bottle.

The cylindrical wall 10 of the insulated bottle is provided at the lower inner portion thereof, below said bottom 12, with an internally threaded portion 13.

The insulated bottle B is provided with a top portion generally represented as 14 having a conventional opening, or mouth 15, extending through the threaded throat 16. A screw plug 17 threadedly engages the throat 16 and can be readily removed by hand when it is desired to pour the contents from the insulated bottle. The screw plug 17 is provided with a rubber washer 18 which engages the flange portion 19 surrounding the mouth of the insulated bottle 15, when the screw plug 17 is fully screwed in the throat 16.

A cap X is threadedly secured to the insulated bottle A, and may be removed therefrom, in the conventional manner. Within the cap X is disposed three drinking cups r, s and t, with the cup s fitting into the cup r, and the cup t fitting into the cup s, so as to provide a compact nested cup assembly, in combination with a compact insulated assembly comprising the three insulated bottles A, B and C.

The insulated bottles A, B and C may vary as to capacity. For example, insulated bottles A and B could represent one-third of a quart capacity, while the insulated bottle C represents one-sixth of a quart capacity.

It is preferred that the end insulated unit, in the complete insulated assembly, e. g., insulated bottle C, should not be provided with the raised bottom portion as are the bottles A and B. Of course, if it is desired to provide an insulated assembly having more than three separate insulated bottles, each of said units with the exception of the end bottle, will be provided with the raised bottom portion which is shaped to receive the top portion of the adjoining insulated bottle.

In operation, the insulated bottle B, is secured to the insulated bottle A by engaging the threaded portion 11 with the interiorly threaded portion of the insulated bottle A, which corresponds to the threaded portion 13 which is disposed on the lower inner wall 10 of the bottle B.

The bottle C is threaded into the bottom cavity of the bottle B, and held in position by threaded engagement.

It is intended to include any means which is adapted to removably secure the bottles A, B and C together into a compact assembly.

The individual insulated bottles may be made of any suitable material known to the trade, e. g., stainless steel, plastic, or the like, and each is suitably insulated in a conventional manner to prevent heat transfer through the walls thereof. I have shown an insulating coating 10a which covers the bottom, top and side walls of each insulated bottle. It is intended to include other types of insulated bottles as a part of my invention provided the structural features of my invention are a part thereof.

It is to be understood that various modifications of this invention will be apparent to those skilled in the art without departing from the spirit thereof, and therefore it is desired to be limited only by the scope of the appended claims.

What is claimed is:

1. An insulated bottle assembly comprising, a plurality of detachably connected insulated bottles, each of said bottles being substantially circular in cross-section and provided with a unitary side wall having a single thickness, the upper end portion of said side wall having its outer surface screw threaded, the top wall of each bottle being integral with said side wall and having a cross-sectional area substantially equal to that of the cross-sectional area of the body portion of the bottle and being provided with a centrally disposed relatively small opening, a closure plug adapted to be received by said opening, some of said bottles having their bottoms formed integrally with said side wall and being raised in their entirety to provide a socket corresponding in shape and size to the top wall of an adjacent bottle, said side wall extending downwardly beyond the raised bottom and having screw threads on its inner surface below said raised bottom to mate with the screw threads on the outer surface of said side wall of an adjacent bottle when the top wall of one bottle is received by the socket of an adjacent bottle, the outer surfaces of the bottle with the exception of the threaded areas being covered with an insulating coating.

2. An insulated bottle assembly as claimed in claim 1 characterized by the fact that a plurality of nested cups are provided and that the outer cup has the lower end portion of its inner wall threaded for engaging the threads on the outer surface of the side wall of the adjacent bottle.

RANDALL L. STALLINGS.

REFERENCES CITED

The following references are of record in the file of this patent:

UNITED STATES PATENTS

| Number | Name | Date |
| --- | --- | --- |
| 372,337 | Simon | Nov. 20, 1887 |
| 526,940 | Pettit et al. | Oct. 2, 1894 |
| 769,615 | Kosansvich | Sept. 6, 1904 |
| 815,883 | Van Blarcom | Mar. 20, 1906 |
| 880,082 | Kendrick | Feb. 25, 1908 |
| 924,890 | Converse | June 15, 1909 |
| 1,261,450 | Smith | Apr. 2, 1918 |
| 2,099,174 | Payson | Nov. 16, 1937 |

FOREIGN PATENTS

| Number | Country | Date |
| --- | --- | --- |
| 481,787 | Great Britain | Mar. 17, 1938 |

OTHER REFERENCES

Publication of the New Economical Method for Transportation of Perishable Food Products, Research Division Mar. 31, 1941, 220–97.